United States Patent
Davalos

[19]

[11] Patent Number: 6,059,347
[45] Date of Patent: May 9, 2000

[54] VISOR ATTACHMENT

[76] Inventor: Sergio Roberto Davalos, 1401 E. Harding St., Long Beach, Calif. 90805

[21] Appl. No.: 09/252,756

[22] Filed: Feb. 19, 1999

[51] Int. Cl.[7] .......................................................... B60J 3/00
[52] U.S. Cl. ......................... 296/97.6; 296/97.1; 296/97.5
[58] Field of Search ................................ 296/97.1, 97.2, 296/97.6, 97.8, 97.9, 97.5

[56] References Cited

U.S. PATENT DOCUMENTS

| D. 339,785 | 9/1993 | Schierau | D12/191 |
|---|---|---|---|
| 4,652,982 | 3/1987 | Flowerday | 362/135 |
| 4,690,451 | 9/1987 | Killar | 296/97.6 |
| 4,792,176 | 12/1988 | Karford | 296/97.8 |
| 4,807,093 | 2/1989 | Cisler | 362/492 |
| 4,978,160 | 12/1990 | Welschoff | 296/97.8 |
| 5,016,938 | 5/1991 | Tschan | 296/97.8 |
| 5,156,434 | 10/1992 | Vandagriff | 296/97.8 |
| 5,516,018 | 5/1996 | Eskandry | 224/312 |
| 5,564,771 | 10/1996 | Chesters | 296/97.5 |
| 5,765,898 | 6/1998 | Crotty, III | 296/97.9 |

FOREIGN PATENT DOCUMENTS 0575011  3/1987  Italy .

*Primary Examiner*—Joseph D. Pape
*Assistant Examiner*—Patricia Engle
*Attorney, Agent, or Firm*—Goldstein & Canino

[57] ABSTRACT

A visor attachment removably attached to a sun visor in a vehicle. The visor attachment comprises a base, a casing mounted on the base, a mirror pivotably mounted on the casing, a mirror cover pivotably mounted on top of the mirror, a filter plate extending downward from the casing, and a pair of lamps adjacent to the mirror. The filter plate is coated with a paste that prevents ultraviolet rays from passing therethrough. The visor attachment further comprises a pair of opaque visor extensions that are slidably mounted within the casing and may be extracted therefrom when pulled in a horizontal direction away from the casing.

5 Claims, 2 Drawing Sheets

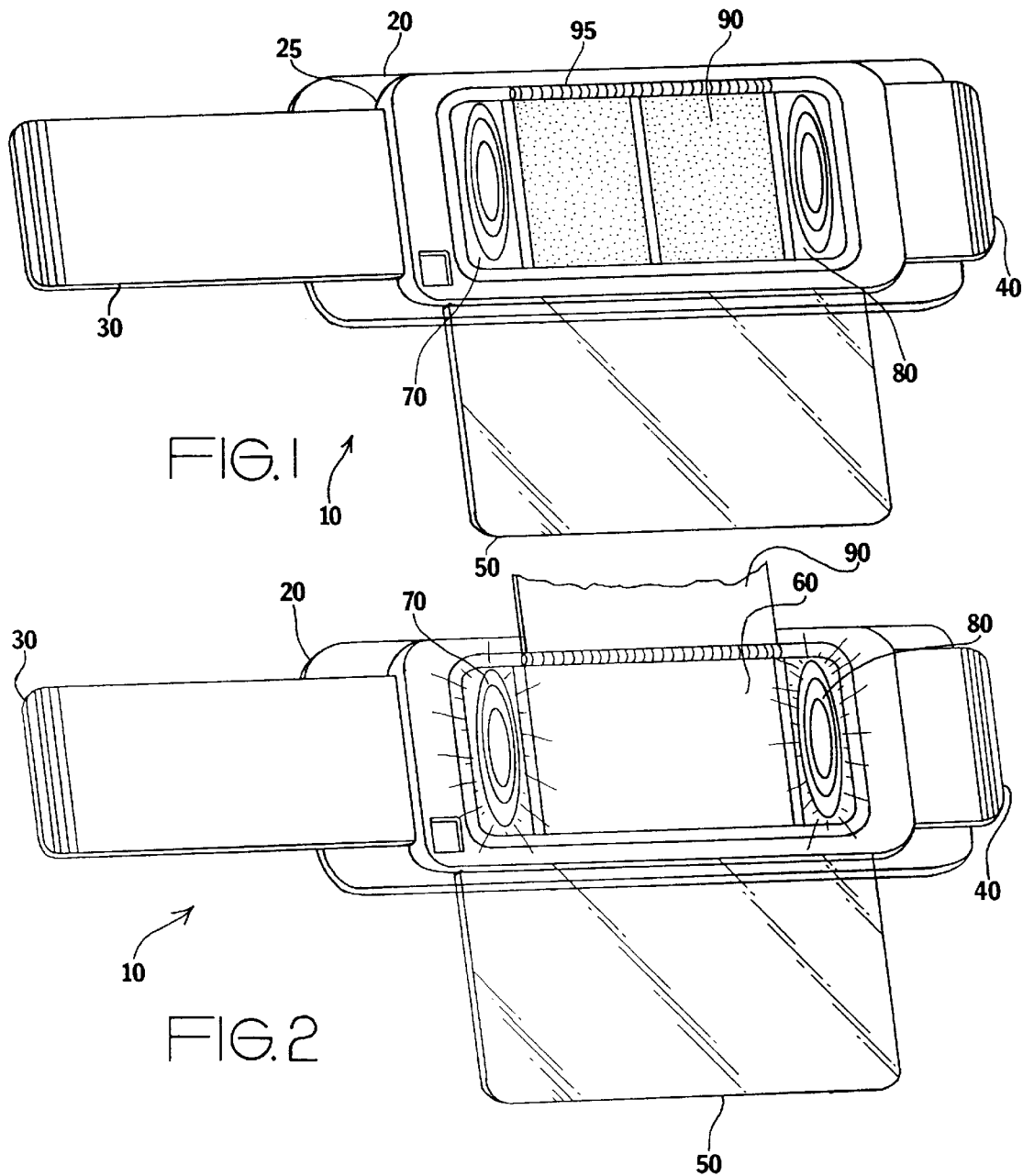

VISOR ATTACHMENT

FIELD OF THE INVENTION

The invention relates to a visor attachment for vehicles. More specifically, the invention relates to a visor attachment that comprises a vanity mirror, vanity lamps, visor extensions and a filter plate that prevents ultraviolet light from passing therethrough.

BACKGROUND OF THE INVENTION

Attempts continue to be made by the automobile industry to make driving a comfortable experience. To help improve the quality of one's driving experience and promote safety on the roads, it is preferable to ensure that drivers are not distracted while driving. Unfortunately, glares from sunlight and from oncoming automobile headlights often interfere with the driver's line of vision, which can unnecessarily distract one during driving. Automobile companies recognize the need for reducing glare, and have responded with multitude of mechanisms that attempt to redress this problem.

Some automobiles come with visor extensions that block glares from interfering with the driver's line of vision. In addition to having visor extensions, some visors include vanity mirrors to allow occupants an opportunity to check their facial appearances.

Some efforts have been made to reduce interference of glare with the driver's line of vision. For example, U.S. Pat. No. 5,564,771 to Chesters discloses a shading device for use upon a vehicle's sun visor, which has a flexible shading endpiece of sufficient size to block the rays of a sun or a headlight glare.

U.S. Pat. No. 5,516,018 to Eskandry discloses an accessory carrier that is mountable on a window visor of an automobile. The accessory carrier has a longitudinal slot through which a tinted, planar viewing screen is laterally extendible.

Unfortunately, most automobile visors fail to completely prevent glare from interfering with the driver's line of vision. Additionally, many vanity mirrors do not include a lighting mechanism, which prevents usage of the mirrors during night time or when the surroundings are dark. While the existing units may be suitable for the particular purpose employed, or for general use, they would not be as suitable for the purpose of the present invention as disclosed hereafter.

SUMMARY OF THE INVENTION

It is an object of the present invention to provide a visor attachment that blocks glare from sun light or other oncoming cars from interfering with the driver's line of vision.

It is another object of the present invention to provide a visor attachment that includes a vanity mirror with vanity lamps that illuminate the mirror for use during night time.

It is a further object of the present invention to provide a device that shields the driver from ultraviolet rays. Accordingly, a visor attachment is disclosed that is mounted onto the sun visor in a vehicle. The visor attachment has a lighted vanity mirror, a pair of opaque visor extensions that blocks light, and a filter plate that prevents ultraviolet rays from passing therethrough.

To the accomplishment of the above related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

The above and other aspects, features and advantages of the present invention will be more apparent from the following detailed description thereof, which is presented in conjunction with the following drawings, wherein corresponding reference characters indicate corresponding components throughout the drawing figures.

FIG. 1 provides a diagrammatic perspective view of the visor attachment, comprising a pair of opaque visor extensions and a transparent filter plate.

FIG. 2 is a diagrammatic perspective view of the vanity visor attachment, showing the vanity mirror and a pair of vanity lamps adjacent to the mirror.

DETAILED DESCRIPTION OF THE PREFERRED EMBODIMENTS

Figure 3:
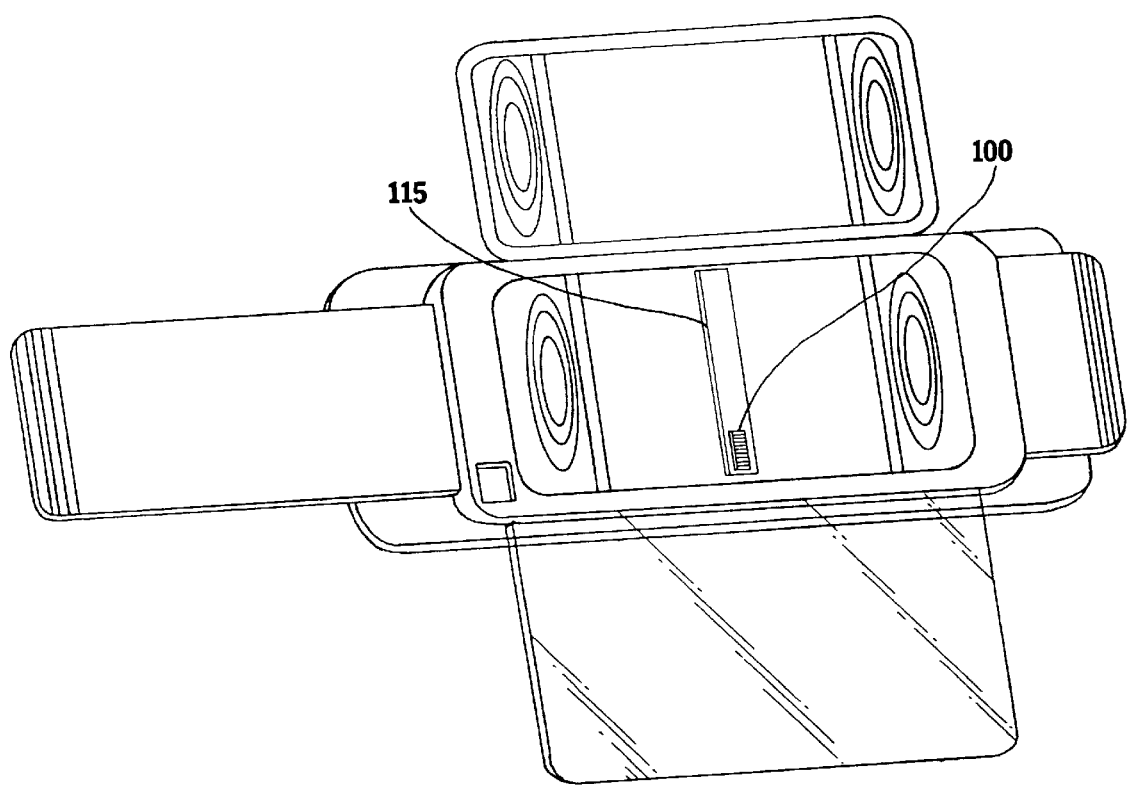
FIG. 3 is a diagrammatic perspective view of the visor attachment with the mirror pivoted upward.

FIG. 1 illustrates a visor attachment 10 that is detachably mounted to a factory-installed sun visor (not shown) in a vehicle. The vanity visor attachment 10 has a base 20 that is provided with at least one clip that secures the visor attachment 10 to the sun visor. The base 20 is mounted with a rectangular casing 25 that is provided with a plurality of slotted openings.

The vanity visor 10 comprises a left visor extension 30 and a right visor extension 40 that are slidably mounted within the casing 25. The left visor extension 30 and the right visor extension 40 are extracted out of the casing 25 through the slotted openings by pulling them outward in a direction away from the casing 25. According to the invention, the left visor extension 30 and the right visor extension 40 are constructed from a substantially opaque material that blocks light from passing therethrough. As a result, the user may selectively pull the left visor 30 and the right visor 40 out of the casing 25 to block the glare generated by the sun and from the headlights of others oncoming vehicles on the road.

As shown in FIG. 2, the visor attachment 10 has a mirror 60 that is pivotably mounted to the casing 25 by a hinge 95. A mirror cover 90 is pivotably mounted by the hinge 95 to the casing 25, such that it covers the mirror 60. As a result, the mirror cover 90 may be pivotably raised or lowered for selectively covering and exposing the mirror 60.

As shown in FIG. 2, the visor attachment 10 has a left lamp 70 and a right lamp 80 on the casing 25 along side the mirror 60. The left lamp 70 and the right lamp 80 are part of an electrical circuit that comprises at least one battery to provide power to the illuminate the lamps. According to the invention, the mirror cover 90 functions as a switch for the circuit, wherein pivoting the mirror cover 90 away from the mirror 60 activates the left lamp 70 and the right lamp 80 to produce a gentle glow. On the other hand, when the mirror cover 90 covers the mirror 60, the left lamp 70 and the right lamp 80 are deactivated.

A substantially transparent filter plate 50 is provided is slidably mounted within the casing 25, wherein the filter plate 50 is extracted from an opening towards the bottom of the casing 25. According to the invention, the filter plate 50 is coated with a paste that prevents ultraviolet rays from passing therethrough.

As shown in FIG. 3, the visor attachment 10 has a grip 100 that is attached to the filter plate 50, wherein the grip 100 enables vertical adjustment of the filter plate 50. The casing 25 has a vertical elongated slot 115, wherein the grip 100 is enclosed therein. According to the invention, the mirror 60 typically covers the slot 115 and the grip 100. As a result, when the filter plate 50 is to be raised or lowered, the mirror 60 is pivoted upward about the hinge 95 and the grip 100 is appropriately moved upward or downward within the slot 115.

Many specific details contained in the above description merely illustrate some preferred embodiments and should not be construed as a limitation on the scope of the invention. Accordingly, many other variations are possible within the spirit of the present invention, limited only by the scope of the appended claims.

What is claimed is:

1. A visor attachment that is clipped onto the sun visor of a vehicle, comprising:

a base;

a casing mounted on the base, said casing having a vertical slot thereon;. a mirror pivotably mounted on said casing, wherein said mirror covers the slot when lying flush with said casing;

a mirror cover pivotably mounted to said casing, wherein said mirror cover allows selective covering and exposing of said mirror;

a filter plate slidably mounted within said casing, wherein said filter plate may be extracted downward from within said casing, said filter plate coated with a paste that prevents ultraviolet radiation from passing therethrough;

a grip mounted on said filter plate, said grip located within said slot of said casing, wherein said grip is selectively moved within said slot to appropriately position said filter plate relative to said casing; and a pair of lamps along side said mirror.

2. The visor attachment of claim 1, further comprising a hinge for pivotably mounting said mirror to said casing, said hinge pivotably mounting said mirror cover on top of said mirror.

3. The visor attachment of claim 2, further comprising a pair of visor extensions slidably mounted within said casing, such that the visor extensions may be extracted from said casing by pulling them horizontally outward in a direction away from said casing.

4. The visor attachment of claim 3, wherein said visor extensions are constructed from a substantially opaque material for blocking light from passing therethrough.

5. The visor attachment of claim 4, wherein said lamps and said mirror cover are part of an electrical circuit, such that said lamps are activated when said mirror cover is pivoted upward in a direction away from said mirror.

* * * * *